United States Patent [19]
Gabrielson

[11] Patent Number: 6,102,289
[45] Date of Patent: Aug. 15, 2000

[54] 1D FINDER PATTERN FOR 2D BAR CODES

[75] Inventor: Donn E. Gabrielson, Everett, Wash.

[73] Assignee: Intermec IP Corp., Beverly Hills, Calif.

[21] Appl. No.: 08/671,472

[22] Filed: Jun. 28, 1996

[51] Int. Cl.[7] .................................................. G06K 7/10
[52] U.S. Cl. .................................. 235/462.01; 235/494
[58] Field of Search .............................. 235/494, 462.01

[56] References Cited

U.S. PATENT DOCUMENTS

| | | | |
|---|---|---|---|
| 4,924,078 | 5/1990 | Sant'Anselmo | 235/494 |
| 5,170,044 | 12/1992 | Pastor | 235/494 |
| 5,262,623 | 11/1993 | Batterman et al. | 235/494 |
| 5,276,315 | 1/1994 | Surka . | |
| 5,304,787 | 4/1994 | Wang | 235/494 |
| 5,446,791 | 8/1995 | Wolley | 235/494 |
| 5,490,217 | 2/1996 | Wang et al. | 235/494 |

*Primary Examiner*—Harold I. Pitts
*Attorney, Agent, or Firm*—Donald A. Streck; Joan H. Pauly

[57] ABSTRACT

An easily findable 2-dimensional bar code is disclosed comprising a 2-dimensional bar code; and, a 1-dimensional bar code directly associated with the 2-dimensional bar code at a known distance and orientation with respect to a starting location of the 2-dimensional bar code whereby the 1-dimensional bar code acts as a locator for the 2-dimensional bar code. In one embodiment, the 1-dimensional bar code is incorporated as part of the 2-dimensional bar code into a hybrid bar code. The 1-dimensional bar code may contain information defining decoding of the 2-dimensional bar code. The 2-dimensional bar code may contain information supplemental to information in the 1-dimensional bar code. The 2-dimensional bar code may also contain information redundant to information in said 1-dimensional bar code. Further, the 1-dimensional bar code contains information required for decoding of the 2-dimensional bar code whereby a greater percentage of the 2-dimensional bar code is available to contain data. The invention also includes a bar code scanning system capable of scanning and decoding either 1-dimensional bar codes or 2-dimensional bar codes combined with 1-dimensional bar codes.

21 Claims, 7 Drawing Sheets

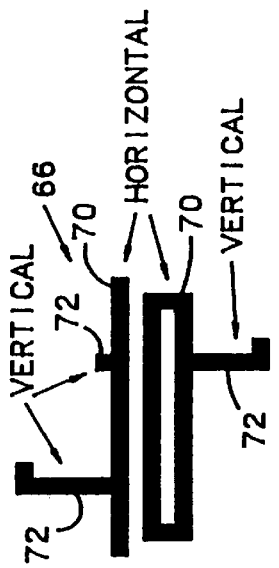
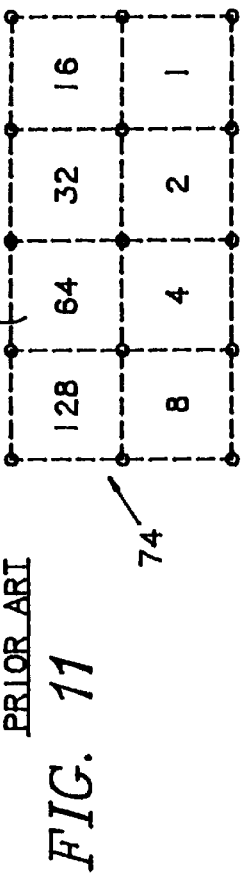
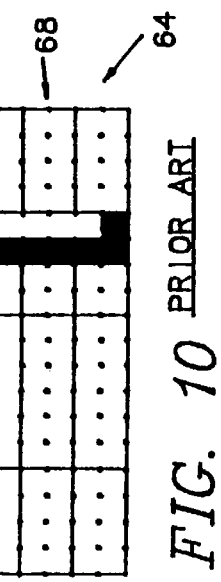
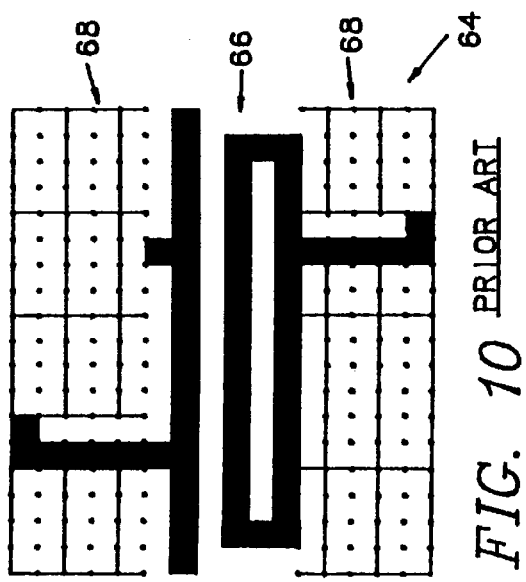
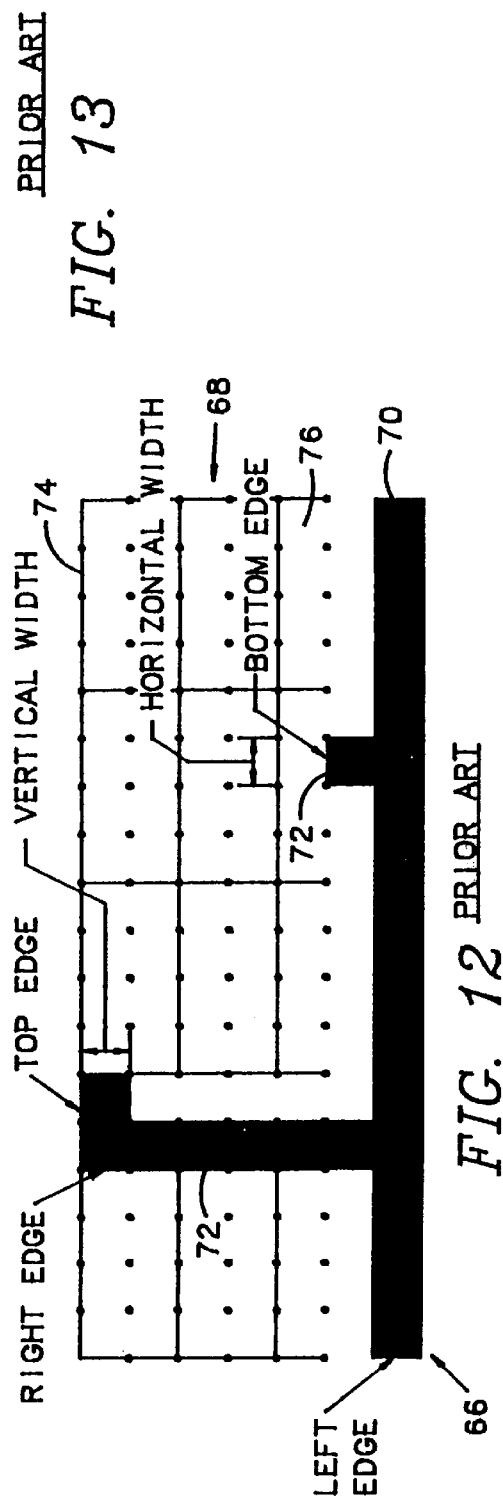
FIG. 10 PRIOR ART
FIG. 11 PRIOR ART
FIG. 13 PRIOR ART
FIG. 12 PRIOR ART

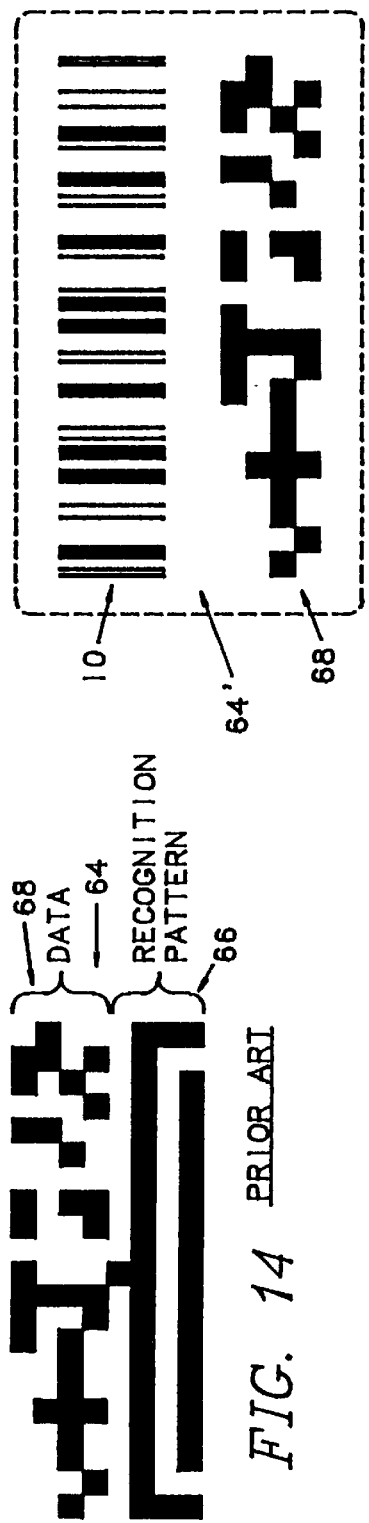
FIG. 15
FIG. 14 PRIOR ART
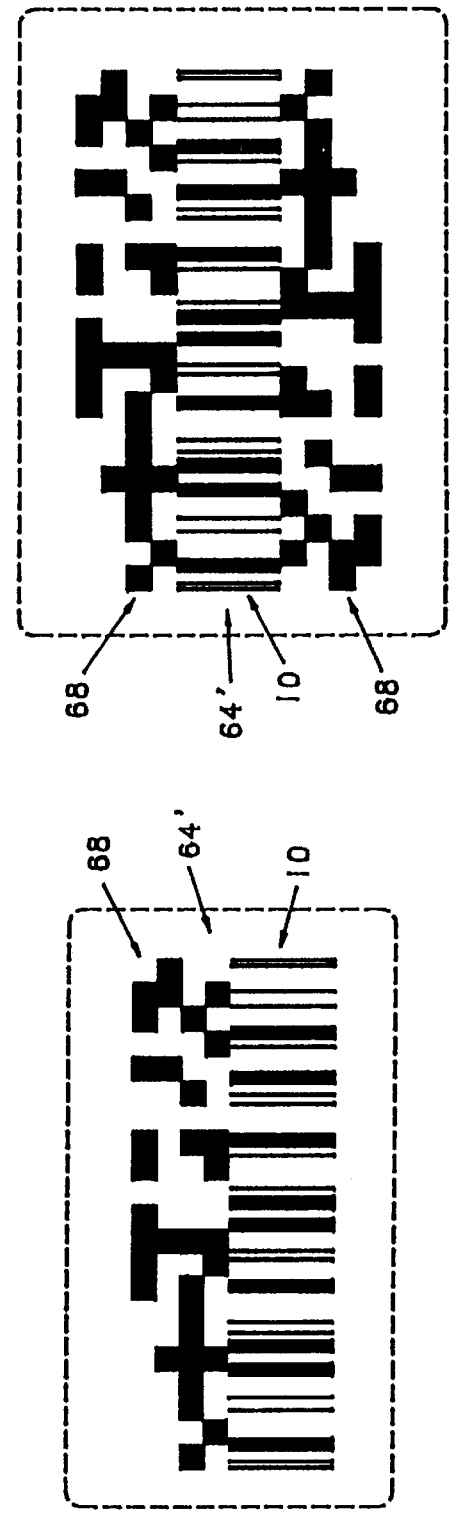
FIG. 17
FIG. 16

1D FINDER PATTERN FOR 2D BAR CODES

BACKGROUND OF THE INVENTION

1. Technical Field

This invention relates to methods and apparatus for scanning bar codes and, more particularly, to an easily findable 2-dimensional bar code comprising, a 2-dimensional bar code; and, a 1-dimensional bar code directly associated with the 2-dimensional bar code at a known distance and orientation with respect to a starting location of the 215 dimensional bar code whereby the 1-dimensional bar code acts as a locator for the 2-dimensional bar code.

2. Background Art

Bar codes as a means of encoding information associated with an object in a manner to allow that information to be obtained rapidly and non-invasively are going through a rapid increase in capabilities. They are getting smaller so that they can be attached to small objects. That creates one set of problems for those designing and manufacturing the scanning apparatus that reads and decodes the bar codes. In order to get more information into a smaller area, bar codes are also moving from one dimensional (1D) to two dimensional (2D) configurations.

As depicted in FIG. 1, the typical prior art 1D bar code 10 is comprised of a number of parallel bars 12 and spaces 14. The 1D bar code 10 can be reflectively scanned by a lightbeam 16 moving across it horizontally or at an angle.

2D bar codes such as that generally indicated as 18 in FIG. 2 are another matter altogether when it comes to scanning and decoding them. 2D bar codes come in various configurations as determined by various manufacturers and adopted standards. The 2D bar code 18 of FIG. 2 is representative only and not intended to be an accurate depiction of an actual bar code. While the 1D bar code 10 only has a "left" and "right" and can be scanned at an angle, a general 2D bar code 18 is a collection of symbols, typically squares 20, arranged in a regular pattern, again typically a square or rectangle. An orientation pattern 19 is added to help a reader find and decode the 2D bar code 18. Often, information is present in the orientation pattern 19 to define the extents of the 2D bar code 18 and the type of encoding that is used in the data represented by the 2D bar code 18. The exact nature of these components of the bar code 18 are not necessary to an understanding of the problem and the present invention. Thus, they will not be addressed in any further detail in the interest of simplicity and the avoidance of redundancy. Suffice it to say, a 2D bar code is a complex structure which is difficult to scan according to prior art techniques.

A 2D bar code such as 18 is typically "scanned" with a video device such as a Charge Coupled Device camera. As depicted in FIG. 3, the bar code 18 is viewed within a field of view 36. The contents of each pixel position within the field of view 36 is stored in a corresponding memory position 38 of a computer memory 40 as depicted in FIG. 4. The data of the memory 40 are analyzed by computer finding logic to determine the orientation of the bar code 18 within the field of view 36. The data is then analyzed as if the bar code 18 was properly oriented horizontally from left to right as depicted in FIG. 5. While the process sounds easy and only took a few sentences to describe, it is, in fact, a very lengthy and computationally intensive process. It is so computationally intensive that decoding performance may suffer as a result. For large field of view scanners, the number of pixels in memory may be large compared to the bar code symbol, so the location process of finding the bar code field of view can be time consuming. Most customers of bar code scanners require the bar code to be completely decoded in a second or less. They also want the position of the bar code as scanned to be completely arbitratry as depicted in FIG. 3. Thus, determining the location and the orientation of the bar code 18 within the field of view 36 in a timely manner becomes an important criteria in 2D scanner/decoder design. To aid in the process, some 2D bar codes include an imbedded 2D locator pattern. While such patterns can help with the finding process, they are special patterns and cannot be read by a multitude of readers. Also, it must be appreciated that any non-data matter contained within the 2D bar code takes up valuable area that can be used for data.

In another aspect of 2D bar codes as they exist in the prior art, separate provision must be made if a 2D bar code is to be interpreted in different ways. A switch or selector dial could be provided on the reader as a means of changing the decode logic employed with the bar code. That approach is limited since the switch or selector dial positions must be pre-defined and cannot be changed easily by the user. Another approach employed is to first scan a bar code defining the decode logic to be employed. A 2D bar code that is self-defining as to its associated decode logic would be a more optimum approach.

Wherefore, it is an object of this invention to provide a 2D bar code which is easy to locate with simple and rapid locating logic.

It is another object of this invention to provide a 2D bar code which can be located with simple and rapid pre-existing 1D scanning logic.

It is still another object of this invention to provide a 2D bar code which is self-defining as to its associated decode logic.

It is yet another object of this invention to provide a bar code scanning apparatus which automatically scans and decodes either 1D or 2D bar codes.

It is a further object of this invention to provide a 2D bar code which has a maximum amount of its area available for data.

Other objects and benefits of this invention will become apparent from the description which follows hereinafter when read in conjunction with the drawing figures which accompany it.

SUMMARY

The foregoing objects have been achieved by the easily findable 2-dimensional bar code of the present invention comprising, a 2-dimensional bar code; and, a 1-dimensional bar code directly associated with the 2-dimensional bar code at a known distance and orientation with respect to a starting location of the 2-dimensional bar code whereby the 1-dimensional bar code acts as a locator for the 2-dimensional bar code.

In one embodiment, the 1-dimensional bar code is incorporated as part of the 2-dimensional bar code into a hybrid bar code.

The 1-dimensional bar code may contain information defining decoding of the 2-dimensional bar code. The 2-dimensional bar code may contain information supplemental to information in the 1-dimensional bar code. The 2-dimensional bar code may also contain information redundant to information in said 1-dimensional bar code. Further, the 1-dimensional bar code may contain information required for decoding of the 2-dimensional bar code whereby a greater percentage of the 2-dimensional bar code is available to contain data.

The present invention also includes a bar code scanning system capable of scanning and decoding either 1-dimensional bar codes or 2-dimensional bar codes combined with 1-dimensional bar codes. The system includes, a scanner for scanning a 2-dimensional field of view containing a bar code; a video memory for holding pixel data associated with a 2-dimensional field of view; and, find and decode logic. The find and decode logic performs the steps of, storing pixel data associated with a 2-dimensional field of view into the video memory; searching the video memory along a pattern of scan lines until a 1-dimensional bar code is found; determining if a 2-dimensional bar code is associated with the 1-dimensional bar code; decoding the 1-dimensional bar code and then exiting if it is not; and, using the 1-dimensional bar code to locate an associated 2-dimensional bar code, and decoding the 2-dimensional bar code and then exiting if it is.

The preferred bar code scanning system additionally comprises, a decode definitions table defining one or more ways of decoding a 2-dimensional bar code; and, the find and decode logic including logic for employing data from the 1-dimensional bar code as a pointer into the decode definitions table and for using an entry from the decode definitions table to decode the 2-dimensional bar code.

DESCRIPTION OF THE DRAWINGS

FIG. 10 is a drawing of one type of a prior art Code One 2D bar code.

FIG. 11 is a drawing of the symbol recognition pattern of the prior art bar code of FIG. 10.

FIG. 12 is an enlarged drawing of a portion of the prior art bar code of FIG. 10.

FIG. 13 is an enlarged drawing of one data element according to one approach in prior art Code One 2D bar codes.

FIG. 14 is a representative prior art Code One 2D bar code according to one type thereof.

FIG. 15 is a drawing of a representative Code One 2D bar code implemented according to the present invention with a 1D bar code associated with the Code One data pattern and acting as a symbol recognition pattern at a fixed distance therefrom.

FIG. 16 is a drawing of a representative Code One 2D bar code implemented according to the present invention with a 1D bar code associated with the Code One data pattern and acting as a symbol recognition pattern directly associated therewith.

FIG. 17 is a drawing of a representative Code One 2D bar code implemented according to the present invention with a 1D bar code disposed between two Code One data patterns and acting as a symbol recognition pattern therefor.

DESCRIPTION OF THE PREFERRED EMBODIMENT

The basic approach of the present invention is to employ a 1D bar code in association with a 2D bar code. The 1D bar code serves two functions—it acts as an easy to find locator and it contains supplemental information which can take several forms.

Figure 6:
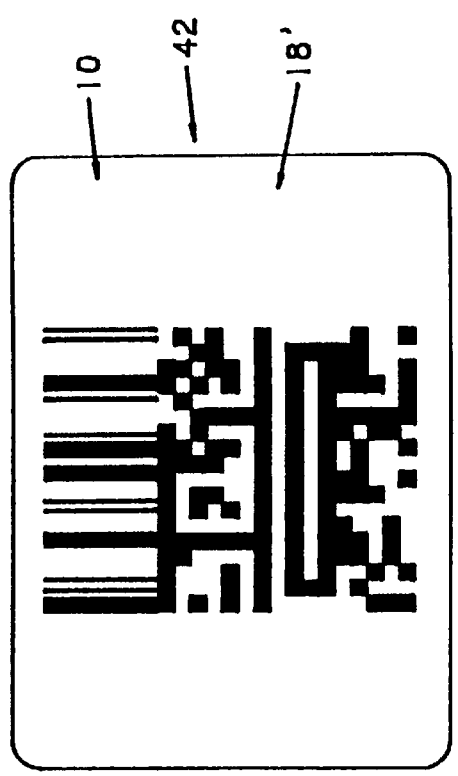
FIG. 6 is a simplified drawing of a 2D bar code according to the present invention in an embodiment where a 1D locating/defining bar code is directly associated as part of the 2D bar code.

In the approach of FIG. 6, there is a hybrid bar code 42 which has a 1D bar code 10 directly associated and in combination with a 2D bar code 18'. The 1D bar code 10 can be added to the top of the 2D bar code 18' as depicted in FIG. 6 or could be put at the bottom or anywhere inbetween. This approach would most likely be employed where the hybrid bar code 42 is being printed at one time.

Figure 7:
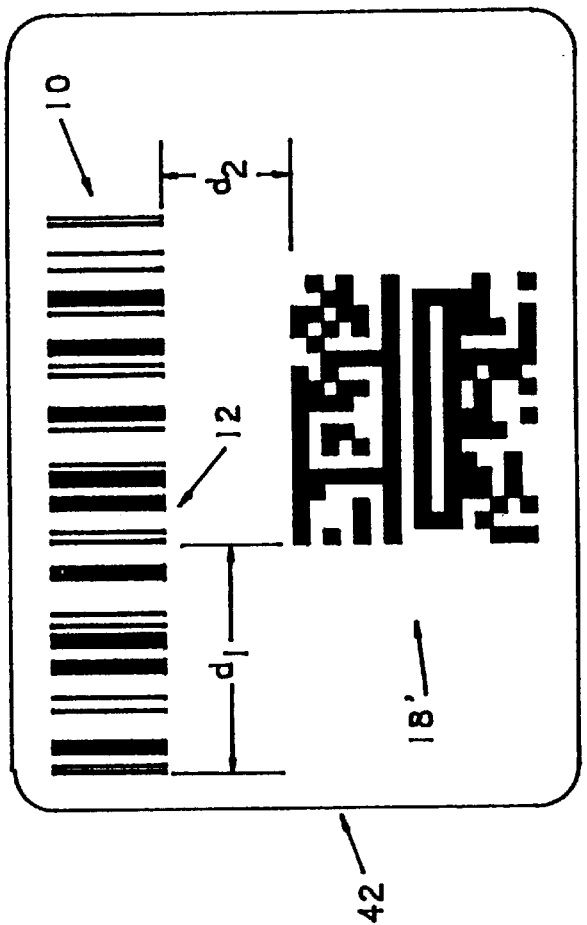
FIG. 7 is a simplified drawing of a 2D bar code according to the present invention in an embodiment where a 1D locating/defining bar code is associated with the 2D bar code at a known distance therefrom.

In the approach of FIG. 7, the 1D bar code 10 is located at known distances d1 and d2 from the 2D bar code 18'. This approach would most likely be employed where the 2D bar code 18' is pre-existing and the 1D bar code 10 is being added to provide the benefits thereof as will now be described in greater detail.

The primary benefit of either of the above-described approaches to the present invention is that the 1D bar code 10 is easily located using presently available finder algorithms. As mentioned earlier, a 1D bar code is much easier and, therefore, faster to find than any 2D bar code with or without a 2D locator pattern. Having found the 1D bar code 10, it is a simple matter to determine the "horizontal" and "vertical" reading orientations thereof since the bars 12 thereof are all parallel. Once the 1D bar code's physical orientation has been determined, it is then a simple matter to determine the locations of the upper-left, upper-right, lower-left, and upper-right extremities thereof as necessary to locate a known starting point of the 2D bar code 18'. At that point, decoding of the 2D bar code 18' is ready to begin.

Figure 1:
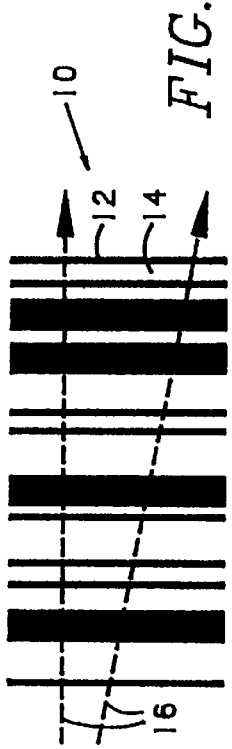
FIG. 1 is a simplified drawing of a prior art 1D bar code depicting how it can be scanned by a reflective light beam moving across it either horizontally or at an angle.
Figure 2:
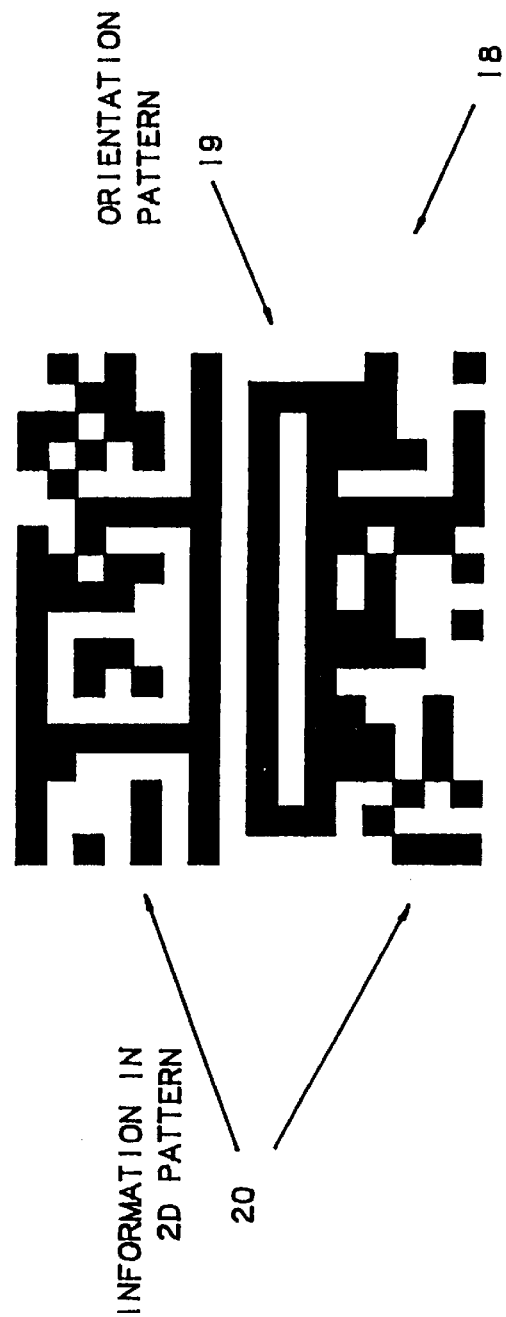
FIG. 2 is a representative 2D bar code according to the prior art with the various components thereof labelled for identification.
Figure 3:
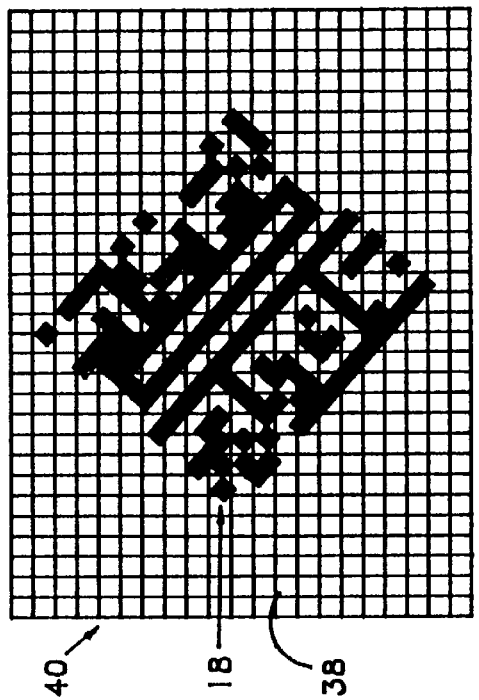
FIG. 3 is a simplified drawing depicting the 2D bar code of FIG. 2 within the field of view of a video scanner.

Another benefit of the present invention may have been noted from a comparison of the prior art representative 2D bar code 18 of FIG. 2 to the 2D bar code 18' of FIGS. 6 and 7. Since the 1D bar code 10 defines the location and orientation of the 2D bar code 18', the 2D bar code 18' does not need the ORIENTATION PATTERN 19. Thus, more of a given bar code area is available for data—a significant benefit in and of itself, particularly where bar code space is at a premium.

As mentioned above, the 1D bar code 10 can also include "supplemental" information. For example, in instances where a small amount of data will suffice in most cases and additional information is only needed on occasion, the basic information can be put in the 1D bar code 10 and the additional information can be put in the 2D bar code 18'. Thus, unless the additional information is required or desired, a rapid decoding of the 1D bar code 10 will fill the requirements. The more time consuming 2D bar code decoding would only be done when the information contained in the 2D bar code 18' is needed.

The 1D bar code 10 could also serve with the 2D bar code 18' as a redundant or backup information system for basic information necessary to processing of the associated item. In this case, such basic information would be put in both the 1D bar code 10 and the 2D bar code 18'. That way, if the decoding of one of the bar codes 10, 18' failed, the necessary information could be obtained from the other without the necessity of shutting down the associated process.

Another very important function that the 1D bar code 10 can serve is defining the 2D bar code 18'. As mentioned earlier, there is no easy way in the prior art to simply and automatically tell the decoding logic what a 2D bar code contains. The present invention solves that problem. The 1D bar code 10 can include information about the associated 2D bar code 18' which can then be used by the associated decoding logic to determine what to do with the 2D bar code 18' for decoding purposes. While the amount of information the 1D bar code 10 can contain is limited, as those of ordinary skill in the art will readily recognize and appreciate, the 1D bar code 10 can be an index or pointer to a table containing a large amount of information for each entry. Thus, the limited information capability of the 1D bar code 10 is easily expanded to virtually any level required to accomplish the associated decoding tasks—including the definition of the actual embedded coding of the 2D bar code.

Having thus described the combined 1D/2D bar code approach of the present invention, hardware implementions to use with such bar codes will now be addressed.

Figure 4:
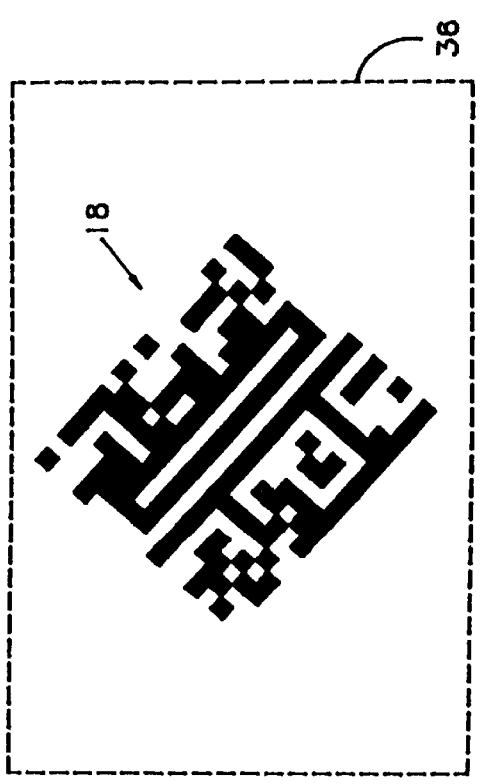
FIG. 4 is a simplified drawing depicting the contents of a computer memory containing the pixel data of the field of view of FIG. 3.
Figure 5:
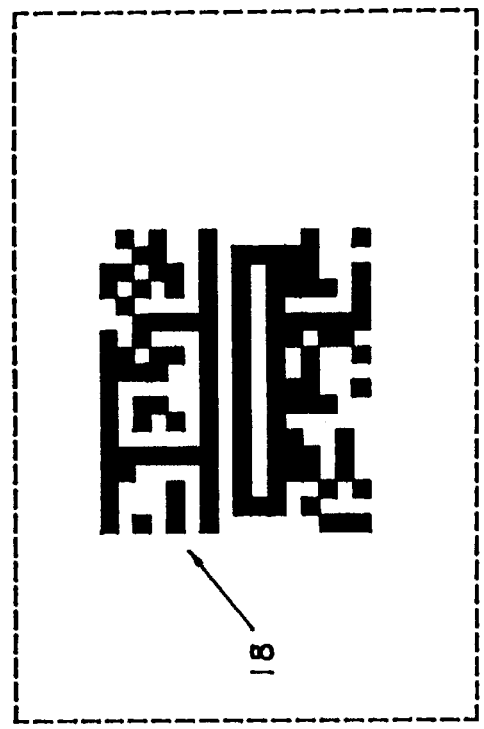
FIG. 5 is a simplified drawing depicting how the 2D bar code of FIG. 2 is interpreted for purposes of decoding once it and its orientation have been found.
Figure 8:
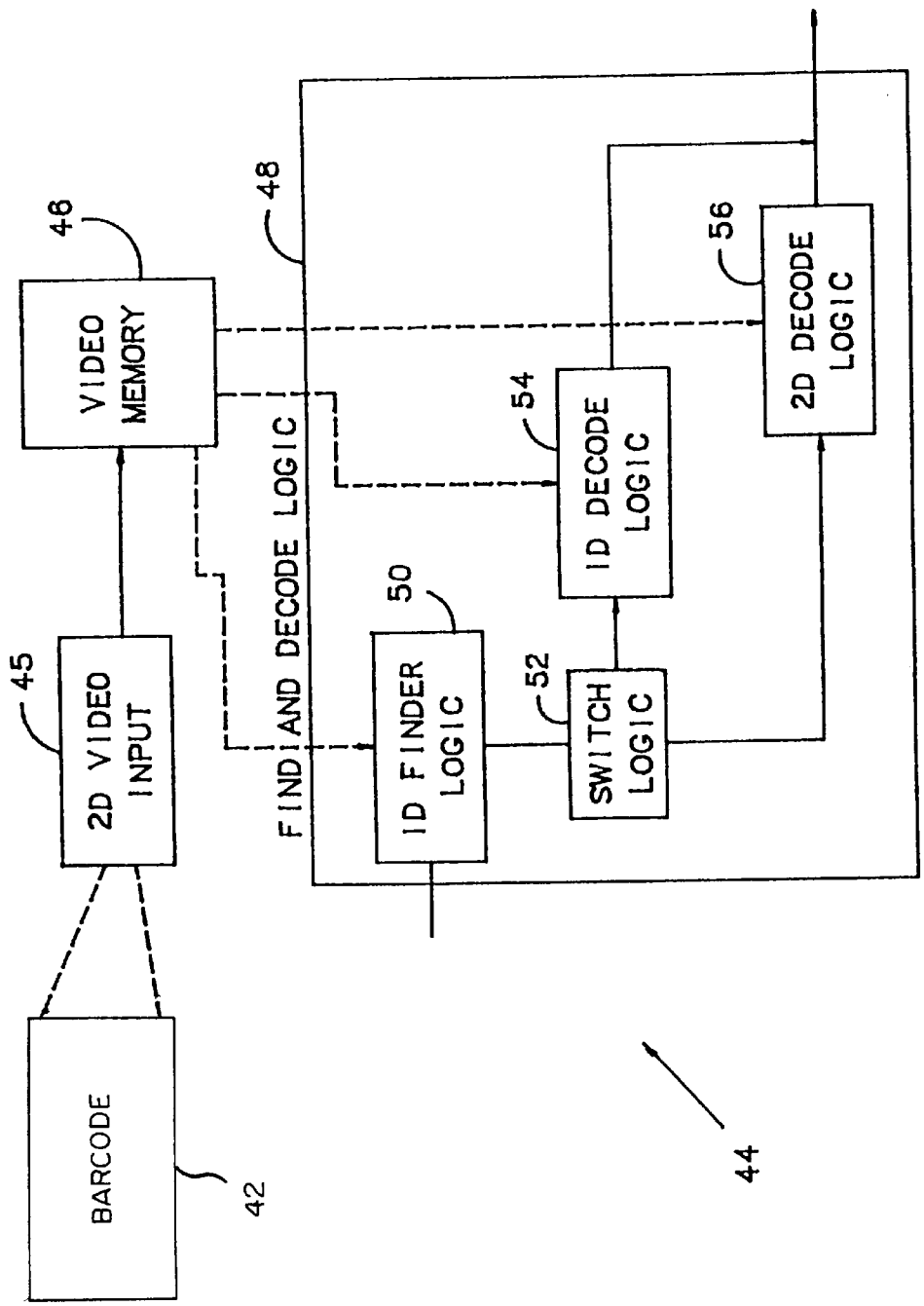
FIG. 8 is a simplified functional block diagram of an exemplary bar code scanner according to a preferred embodiment of the present invention which can scan both 1D and 2D bar codes.

A basic scanning and decoding system 44 according to the present invention which will scan either 1D or 2D bar codes is shown in simplified functional block diagram form in FIG. 8. The hybrid bar code 42 (as in FIGS. 6 or 7) is viewed by a two dimensional video input device 45 of a kind known in the art which creates a pixel map as in FIG. 4 in the video memory 46. The contents of the video memory 46 are accessed by the find and decode logic 48 in order to find the 1D bar code 10 and, thereby, the 2D bar code 18' and thereafter decode the contents thereof. The find and decode logic 48 first contains 1D finder logic 50 which can be according to a new finder algorithm or employ any known 1D finder algorithm. After the 1D bar code 10 has been found, the switch logic 52 determines if the system is decoding 1D or 2D bar codes. If decoding 1D bar codes, the switch logic 52 transfers control to the 1D decode logic 54 which, like the 1D finder logic 50, can be according to a new decoding algorithm or employ a known 1D decoding algorithm. If decoding 2D bar codes, the switch logic 52 transfers control to the 2D decode logic 56 which first locates the 2D bar code from its relationship with the 1D bar code and then decodes the 2D bar code either according to a new decoding algorithm or employing a modified known 2D decoding algorithm. Note that if the system 44 is to be used for the decoding of 2D bar codes only, the switch logic 52 and 1D decode logic 54 can, of course, be omitted as being unnecessary.

Figure 9:
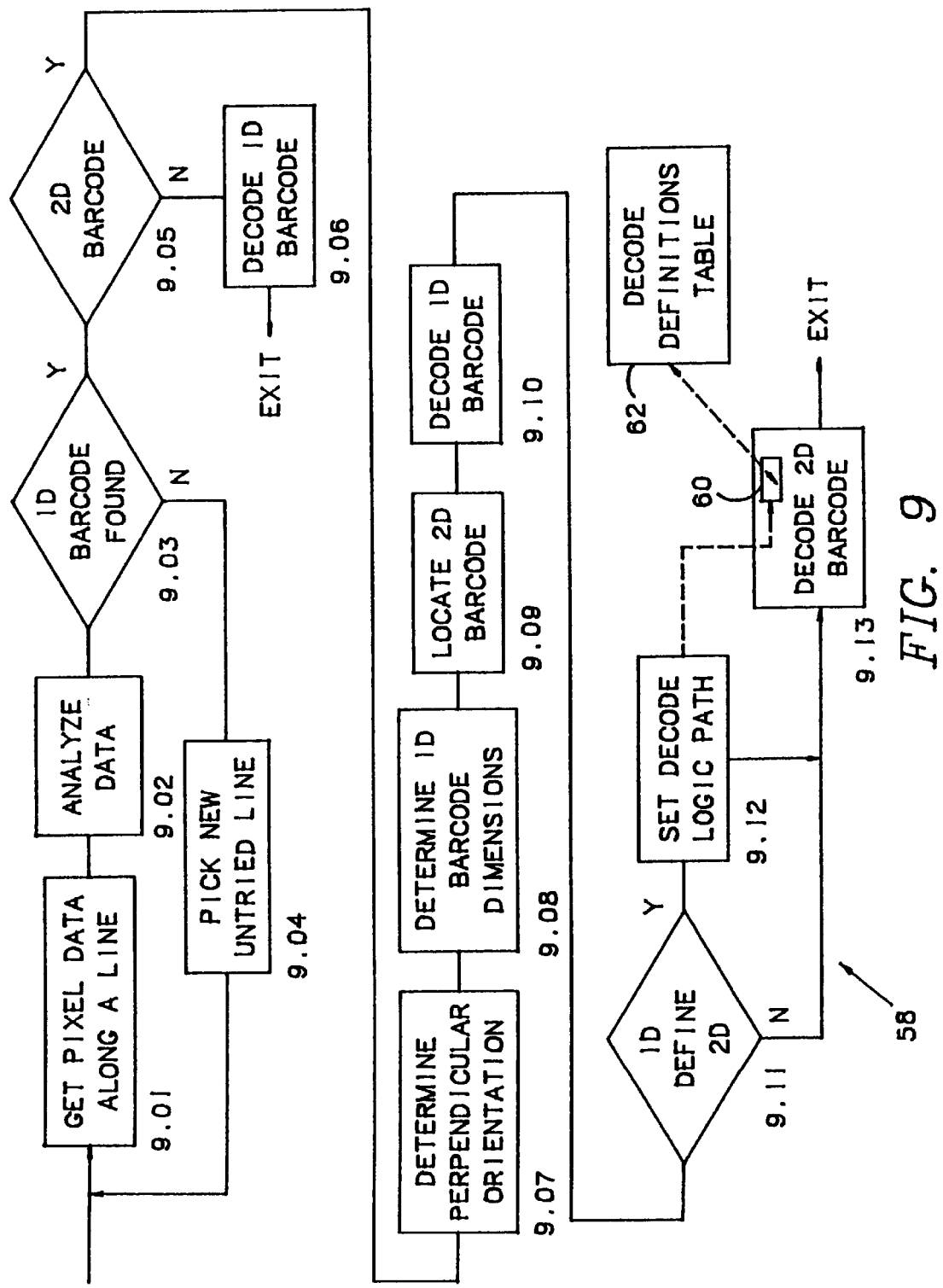
FIG. 9 is exemplary logic that can be used in the scanner of FIG. 8 to add the ability to have the 1D bar code define the decode logic employed with the 2D bar code.

FIG. 9 is a flowchart of representative system logic 58 that can be employed in a preferred implementation of the present invention in combination with the system 44 of FIG. 8. Blocks 9.01 through 9.04 represent the 1D finder logic 50. The logic 58 in blocks 9.01 through 9.04 scans various "lines" of pixel data within the video memory 46 until the 1D bar code 10 has been found. Decision block 9.05 represents the switch logic 52. If there if no 2D bar code 18' associated with the 1D bar code 10, the logic 58 proceeds to block 9.06 (corresponding to the 1D decode logic 54) where the 1D bar code 10 is decoded, after which the logic 58 exits.

The remaining blocks 9.07 through 9.13 of the system logic 58 correspond in general to the 2D decode logic 56 of FIG. 8. Some additional capabilities have been added in this preferred implementation, however. In blocks 9.07 through 9.09, the 1D bar code 10 is used to locate the 2D bar code 18' and determine its orientation so that it can be decoded. At block 9.10, the 1D bar code 10 is decoded. Decision block 9.11 then looks at the data contained in the 1D bar code 10 to determine if it is defining the 2D bar code 18' in any manner. If it is not, the logic 58 out of decision block 9.11 moves directly to block 9.13 where the 2D bar code 18' is decoded.

If the 1D bar code 10 does define the decoding of the 2D bar code 18', control passes to block 9.12 which sets the decode logic path within block 9.13. While this may simply comprise setting a path switch to different logic paths contained within block 9.13, the preferred approach is to set a pointer 60 into a decode definitions table 62 which is used by the logic of block 9.13 to decode the 2D bar code 18'. By taking this approach, new 2D bar codes can be employed with the logic 58 by merely updating the data within the decode definitions table 62.

Another application of the present invention is depicted in FIGS. 10–17. FIG. 10 depicts the structure of a so-called "Code One" two-dimensional matrix symbology generally indicated as 64. Code One 2D bar codes come in a variety of types and sizes. Each, however, contains elements common to the others. As indicated in FIG. 10, the bar code 64 contains a symbol recognition pattern 66 and a data matrix 68. The symbol recognition pattern 66 as depicted in FIG. 11 includes horizontal portions 70 and vertical portions 72. The overall structure of the horizontal portion is unique to each type of Code One pattern and, therefore, defines the type of Code One pattern to the decoding logic. As shown in greater detail in FIG. 12, the horizontal and vertical portions 70, 72 define the sizing of the elements 74 of the data matrix 68. The elements 74 of the data matrix 68 vary in structure according to the type of Code One pattern being employed for the data. Larger and more complex types of Code One patterns have the ability to contain more complex types of data than smaller patterns. A typical element 74 capable of storing alpha-numeric data is depicted in FIG. 13. As can be seen from the labeling, the element 74 comprises eight "bit positions" 76 corresponding to an eight bit binary number. The least significant "bit" 76 is the bit labeled "1" which corresponds to two to the zero power, i.e. $2^0$. As can be seen, the bits are contained from right to left and from bottom to top. Thus, the most significant "bit" 76 is the bit labeled "128" which corresponds to two to the eight power or $2^8$. In use, the Code One elements 74 contain bit positions 76 which are white for binary "zeros" and black for binary "ones". Thus, the element 74 of FIG. 13 can be used to store alpha-numeric characters. For example, in binary the alpha-numerica character "A" is 01000010 or decimal 64. To represent an alpha-numeric "A" with the element 74 of FIG. 13, bit positions "128", "32", "16", "8", "4", and "1" would be white or "zero" while bit positions "64" and "2" (totaling 66) would be black or "1".

An actual Code One two-dimensional matrix symbology of one type is depicted by way of example in FIG. 14. The same data pattern employing the present invention is depicted in two approaches in FIGS. 15 and 16. In FIG. 15, the symbol recognition pattern 66 has been replaced by a 1D bar code 10 at a known location with respect to the data matrix 68. All the information contained in the symbol recognition pattern 66 is now contained in the 1D bar code 10. In FIG. 16, the symbol recognition pattern 66 has been replaced by a 1D bar code 10 directly associated with the data matrix 68. FIG. 17 depicts a still further approach wherein the symbol recognition pattern 66 has been replaced by a 1D bar code 10 disposed between portions of the data matrix 68.

Wherefore, having thus described the present invention, what is claimed is:

1. A plural-component symbology, comprising:
   a) a 2-dimensional bar code having a predefined location; and
   b) a 1-dimensional bar code associated with said 2-dimensional bar code at a known distance and orientation with respect to said predefined location of said 2-dimensional bar code, said distance and said orientation being predetermined to enable said 1-dimensional bar code to act as a locator for said 2-dimensional bar code to facilitate finding of said 2-dimensional bar code, and said distance including a horizontal component $d_1$ and a vertical component $d_2$, each of $d_1$ and $d_2$ being $\geq 0$.

2. The symbology of claim 1 wherein $d_2=0$.

3. The easily findable 2-dimensional bar code of claim 1 wherein:
   said 1-dimensional bar code contains information defining decoding of said 2-dimensional bar code.

4. The easily findable 2-dimensional bar code of claim 1 wherein:
   said 2-dimensional bar code contains information supplemental to information in said 1-dimensional bar code.

5. The easily findable 2-dimensional bar code of claim 1 wherein:
   said 2-dimensional bar code contains information redundant to information in said 1-dimensional bar code.

6. The symbology of claim 1 wherein:
   said 1-dimensional bar code contains information required for decoding of said 2-dimensional bar code and replaces a symbol recognition pattern of said 2-dimensional bar code.

7. A method for easily finding and orienting a 2-dimensional bar code comprising:
   a) associating a 1-dimensional bar code with the 2-dimensional bar code at a predetermined distance and orientation with respect to a predefined location of the 2-dimensional bar code, said distance including a horizontal component $d_1$ and a vertical component $d_2$, each of $d_1$ and $d_2$ being $>0$;
   b) scanning the 1-dimensional bar code in combination with the 2-dimensional bar code and creating a pixel memory map thereof;
   c) searching the pixel memory map along a pattern of scan lines until the 1-dimensional bar code is found; and
   d) using the predetermined distance and orientation of the 1-dimensional bar code with respect to the 2-dimensional bar code to fix the location and orientation of the 2-dimensional bar code within the data of the pixel memory map.

8. The method of claim 7, further comprising:
   a) decoding the 1-dimensional bar code; and
   b) employing data from the 1-dimensional bar code to decode data contained in the 2-dimensional bar code data.

9. The method of claim 8, comprising:
   a) providing a decode definitions table defining one or more ways of decoding the 2-dimensional bar code; and
   b) employing data from the 1-dimensional bar code as a pointer into the decode definitions table, and using an entry from the decode definitions table to decode the data contained in the 2-dimensional bar code.

10. A bar code scanning system comprising:
    a) at least one symbology according to claim 1;
    b) a scanner for scanning a 2-dimensional field of view containing said symbology;
    c) a video memory for holding pixel data associated with said 2-dimensional field of view; and
    d) find and decode logic for:
       d1) storing pixel data associated with said 2-dimensional field of view into said video memory;
       d2) searching said video memory along a pattern of scan lines until said 1-dimensional bar code of said symbology is found;
       d3) using said 1-dimensional bar code to locate said 2-dimensional bar code of said symbology; and
       d4) decoding said 2-dimensional bar code.

11. The bar code scanning system of claim 10 and additionally comprising:
    a) a decode definitions table defining one or more ways of decoding a 2-dimensional bar code; and,
    b) said find and decode logic including logic for employing data from said 1-dimensional bar code as a pointer into said decode definitions table and for using an entry from said decode definitions table to decode said 2-dimensional bar code.

12. A method for automatically decoding a 2-dimensional bar code having a plurality of interpretations comprising:
    a) prior to scanning:
       a1) associating a 1-dimensional bar code with the 2-dimensional bar code at a predetermined distance and orientation with respect to a predefined location of the 2-dimensional bar code, said distance including a horizontal component $d_1$ and a vertical component $d_2$, each of $d_1$ and $d_2$ being $\geq 0$; and
       a2) including a definition of the interpretation to be accorded the 2-dimensional bar code at a time of decoding within the 1-dimensional bar code; and
    b) at a time of scanning:
       b1) scanning the 1-dimensional bar code in combination with the 2-dimensional bar code and creating a pixel memory map thereof;
       b2) searching the pixel memory map along a pattern of scan lines until the 1-dimensional bar code is found;
       b3) decoding the 1-dimensional bar code and obtaining the definition of the interpretation to be accorded the 2-dimensional bar code therefrom;
       b4) using said predetermined distance and orientation of the 1-dimensional bar code with respect to the 2-dimensional bar code to fix the location and orientation of the 2-dimensional bar code within the pixel memory map; and
       b5) decoding the 2-dimensional bar code from the pixel memory map according to the definition of the interpretation to be accorded the 2-dimensional bar code from the 1-dimensional bar code.

13. The method of claim 12 comprising:
a) providing a decode definitions table defining one or more ways of decoding the 2-dimensional bar code; and
b) employing data from the 1-dimensional bar code as a pointer into the decode definitions table, and using an entry from the decode definitions table to decode data contained in the 2-dimensional bar code.

14. The symbology of claim 6, wherein said 1-dimensional bar code is disposed between portions of a data matrix of said 2-dimensional bar code.

15. The symbology of claim 1, wherein said 1-dimensional bar code is disposed between portions of a data matrix of said 2-dimensional bar code.

16. The symbology of claim 1, wherein said 1-dimensional bar code and said 2-dimensional bar code are at least partially vertically aligned, one above another.

17. The symbology of claim 4, wherein said 1-dimensional bar code and said 2-dimensional bar code are at least partially vertically aligned, one above another.

18. The symbology of claim 5, wherein said 1-dimensional bar code and said 2-dimensional bar code are at least partially vertically aligned, one above another.

19. The method of claim 7, wherein associating the 1-dimensional bar code includes at least partially vertically aligning the 1-dimensional and the 2-dimensional bar codes, one above another.

20. The method of claim 12, wherein associating the 1-dimensional bar code includes at least partially vertically aligning the 1-dimensional and the 2-dimensional bar codes, one above another.

21. The system of claim 10, wherein said 1-dimensional bar code and said 2-dimensional bar code are at least partially vertically aligned, one above another.

* * * * *

UNITED STATES PATENT AND TRADEMARK OFFICE
CERTIFICATE OF CORRECTION

PATENT NO. : 6,102,289  
DATED : August 15, 2000  
INVENTOR(S) : Donn E. Gabrielson It is certified that error appears in the above-identified patent and that said Letters Patent is hereby corrected as shown below:

Column 6,
Line 3, "If there if" should be -- If there is --.

Column 7, claim 3,
Line 1, "easily findable 2-dimensional bar code" should be -- symbology --.

Column 7, claim 4,
Line 1, "easily findable 2-dimensional bar code" should be -- symbology --.

Column 7, claim 5,
Line 1, "easily findable 2-dimensional bar code" should be -- symbology --.

Signed and Sealed this

Eighteenth Day of December, 2001

*Attest:*

JAMES E. ROGAN  
*Attesting Officer*     *Director of the United States Patent and Trademark Office*